(12) United States Patent
Yoon et al.

(10) Patent No.: US 10,136,125 B2
(45) Date of Patent: Nov. 20, 2018

(54) CURVED MULTI-VIEW IMAGE DISPLAY APPARATUS AND CONTROL METHOD THEREOF

(71) Applicant: SAMSUNG ELECTRONICS CO., LTD., Suwon-si (KR)

(72) Inventors: Jung-hoon Yoon, Seongnam-si (KR); Ki-hyung Kang, Suwon-si (KR); Keun-bae Jeon, Suwon-si (KR); Seon-deok Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 281 days.

(21) Appl. No.: 14/704,293

(22) Filed: May 5, 2015

(65) Prior Publication Data

US 2016/0021367 A1 Jan. 21, 2016

(30) Foreign Application Priority Data

Jul. 18, 2014 (KR) ........................ 10-2014-0091206

(51) Int. Cl.
*H04N 13/398* (2018.01)
*H04N 13/305* (2018.01)
(Continued)

(52) U.S. Cl.
CPC ....... *H04N 13/398* (2018.05); *G02B 27/2214* (2013.01); *G09G 3/003* (2013.01);
(Continued)

(58) Field of Classification Search
CPC ........... H04N 13/0497; H04N 13/0415; H04N 13/0422; H04N 13/0404; H04N 13/0409;
(Continued)

(56) References Cited

U.S. PATENT DOCUMENTS 7,262,767 B2    8/2007   Yamada
7,834,962 B2   11/2010   Satake et al.
(Continued)

FOREIGN PATENT DOCUMENTS

CN       1963595 A    5/2007
CN    101349817 A    1/2009
(Continued)

OTHER PUBLICATIONS

Communication dated Jun. 24, 2015, issued by the International Searching Authority in counterpart International Application No. PCT/KR2015/003570 (PCT/ISA/210).
(Continued)

*Primary Examiner* — Christopher S Kelley
*Assistant Examiner* — Matthew K Kwan
(74) *Attorney, Agent, or Firm* — Sughrue Mion, PLLC

(57) ABSTRACT

A curved multi-view image display apparatus is provided. The curved multi-view image display apparatus includes: a curved display panel which includes a plurality of sub-pixels and has a curvature; a viewing zone divider provided on in front of the display panel and configured to divide a viewing zone and provide a plurality of optical views; a renderer configured to render a multi-view image to be output to the display panel; and a controller configured to determine a rendering pitch for each of the plurality of optical views based on the curvature, and control the renderer so that at least some of the plurality of sub-pixels to output a pixel value corresponding to a plurality of multi-view images based on the determined rendering pitch.

19 Claims, 16 Drawing Sheets

(51) Int. Cl.
  *H04N 13/31* (2018.01)
  *G02B 27/22* (2018.01)
  *G09G 3/00* (2006.01)
  *H04N 13/324* (2018.01)
  *H04N 13/317* (2018.01)

(52) U.S. Cl.
  CPC ........... *H04N 13/305* (2018.05); *H04N 13/31* (2018.05); *H04N 13/317* (2018.05); *H04N 13/324* (2018.05); *G09G 2320/028* (2013.01); *G09G 2354/00* (2013.01); *H04N 2213/001* (2013.01)

(58) Field of Classification Search
  CPC .. H04N 13/398; H04N 13/317; H04N 13/324; H04N 13/31; H04N 13/305; H04N 2213/001; G02B 27/2214; G09G 3/003; G09G 2320/028; G09G 2354/00
  USPC .......................................................... 348/59
  See application file for complete search history.

(56) References Cited

U.S. PATENT DOCUMENTS

| | | | |
|---|---|---|---|
| 8,681,174 | B2 | 3/2014 | Nam et al. |
| 8,964,009 | B2 | 2/2015 | Yoshida |
| 9,177,411 | B2 | 11/2015 | Hwang et al. |
| 9,237,335 | B2 | 1/2016 | Fukushima et al. |
| 2006/0061569 | A1 | 3/2006 | Yamada |
| 2009/0161048 | A1 | 6/2009 | Satake et al. |
| 2011/0102423 | A1 | 5/2011 | Nam et al. |
| 2011/0304614 | A1 | 12/2011 | Yasunaga |
| 2012/0105805 | A1 | 5/2012 | Kuo et al. |
| 2012/0182407 | A1 | 7/2012 | Yoshida |
| 2012/0249530 | A1* | 10/2012 | Fukushima ......... G02B 27/2214 345/419 |
| 2012/0257815 | A1* | 10/2012 | Schlosser ........... H04N 13/0037 382/154 |
| 2013/0027394 | A1 | 1/2013 | Kho et al. |
| 2014/0133022 | A1* | 5/2014 | Kim .................... G02B 27/2214 359/463 |
| 2014/0192044 | A1 | 7/2014 | Hwang et al. |

FOREIGN PATENT DOCUMENTS

| | | |
|---|---|---|
| CN | 101464582 A | 6/2009 |
| CN | 102279513 A | 12/2011 |
| CN | 102472898 A | 5/2012 |
| CN | 102681181 A | 9/2012 |
| CN | 102822724 A | 12/2012 |
| CN | 103916655 A | 7/2014 |
| EP | 2 753 086 A2 | 7/2014 |
| JP | 6-289320 A | 10/1994 |
| JP | 2005-31367 A | 2/2005 |
| JP | 2005151534 A | 6/2005 |
| JP | 2012060345 A | 3/2012 |
| KR | 1020110049039 A | 5/2011 |
| KR | 1020130012504 A | 2/2013 |
| KR | 1020140109168 A | 9/2014 |

OTHER PUBLICATIONS

Communication dated Jun. 24, 2015, issued by the International Searching Authority in counterpart International Application No. PCT/KR2015/003570 (PCT/ISA/237).
Communication issued Nov. 16, 2017 by the State Intellectual Property Office of P.R. China in counterpart Chinese Patent Application No. 201510338359.4.
Communication dated Feb. 26, 2018, issued by the European Patent Office in counterpart European Application No. 15821692.9.
Communication dated Mar. 13, 2018, issued by the Japanese Patent Office in counterpart Japanese Application No. 2017-502606.
Communication dated Jul. 17, 2018, issued by the Korean Intellectual Property Office in counterpart Korean Patent Application No. 10-2014-0091206.

* cited by examiner

FIG. 8

| LN | VL(VNxLN) | Θ | X | Y | β[VL-2] | β[VL-1] | β[VL+1] | β[VL+2] |
|---|---|---|---|---|---|---|---|---|
| 0 | 0 | 0 | 0 | 3000 | 2.405009 | 1.203035 | 1.203035 | 2.405009 |
| 1 | 5 | 0.010010078 | 0.524126 | 3000 | 2.405027 | 1.203039 | 1.203030 | 2.404992 |
| 2 | 10 | 0.020020156 | 1.048253 | 3000 | 2.405044 | 1.203043 | 1.203026 | 2.404974 |
| 3 | 15 | 0.030030234 | 1.572379 | 3000 | 2.405062 | 1.203048 | 1.203021 | 2.404956 |
| 4 | 20 | 0.040040312 | 2.096506 | 2999.999 | 2.405079 | 1.203052 | 1.203017 | 2.404938 |
| 5 | 25 | 0.05005039 | 2.620632 | 2999.999 | 2.406096 | 1.203056 | 1.203012 | 2.40492 |
| 6 | 30 | 0.060060468 | 3.144758 | 2999.998 | 2.405114 | 1.20306 | 1.203007 | 2.404902 |
| 7 | 35 | 0.070070546 | 3.668884 | 2999.998 | 2.405131 | 1.203065 | 1.203003 | 2.404884 |
| 8 | 40 | 0.080080624 | 4.19301 | 2999.997 | 2.405148 | 1.203069 | 1.202998 | 2.404866 |
| 9 | 45 | 0.090090702 | 4.717136 | 2999.996 | 2.405165 | 1.203073 | 1.202993 | 2.404848 |
| 10 | 50 | 0.10010078 | 5.241262 | 2999.995 | 2.405182 | 1.203077 | 1.202989 | 2.404829 |

| LN | VL(VNxLN) | D[VL-2] | D[VL-1] | D[VL+1] | D[VL+2] | D'[VL-2] | D'[VL-1] | D'[VL+1] | D'[VL+2] |
|---|---|---|---|---|---|---|---|---|---|
| 0 | 0 | | | 0.105 | 0.21 | | | 4 | 5 |
| 1 | 5 | 0.210001538 | 0.105000384 | 0.104999613 | 0.209998456 | 0.999985355 | 1.999996346 | 3.999996316 | 4.999985294 |
| 2 | 10 | 0.210003069 | 0.105000764 | 0.104999223 | 0.209996905 | 0.999970771 | 1.999992723 | 3.999992601 | 4.999970527 |
| 3 | 15 | 0.210004594 | 0.105001141 | 0.10499883 | 0.209995348 | 0.999956247 | 1.999989131 | 3.999988856 | 4.9999557 |
| 4 | 20 | 0.210004594 | 0.105001515 | 0.104998433 | 0.209993785 | 0.999941785 | 1.999985568 | 3.99998508 | 4.999940811 |
| 5 | 25 | 0.210006113 | 0.105001886 | 0.104998034 | 0.209992216 | 0.999927383 | 1.999982037 | 3.999981274 | 4.999925862 |
| 6 | 30 | 0.210007625 | 0.105002254 | 0.104997631 | 0.209990639 | 0.999913042 | 1.999978536 | 3.999977438 | 4.999910852 |
| 7 | 35 | 0.210009131 | 0.105002618 | 0.104997225 | 0.209989057 | 0.999898762 | 1.999975065 | 3.999973571 | 4.999895781 |
| 8 | 40 | 0.210012123 | 0.105002979 | 0.104996816 | 0.209987468 | 0.999884542 | 1.999971625 | 3.999969673 | 4.999880649 |
| 9 | 45 | 0.21001361 | 0.105003337 | 0.104996403 | 0.209985873 | 0.999870384 | 1.999968215 | 3.999965745 | 4.999865457 |
| 10 | 50 | 0.21001509 | 0.105003692 | 0.104995988 | 0.209984271 | 0.999856286 | 1.999964836 | 3.999961786 | 4.999850203 |

Existing View Map Table

| VL(VNxLN) | M[VL-2] | M[VL-1] | M[VL] | M[VL+2] | M[VL+2] |
|---|---|---|---|---|---|
| 0 | | | 3 | 4 | 5 |
| 5 | 1 | 2 | 3 | 4 | 5 |
| 10 | 1 | 2 | 3 | 4 | 5 |
| 15 | 1 | 2 | 3 | 4 | 5 |
| 20 | 1 | 2 | 3 | 4 | 5 |
| 25 | 1 | 2 | 3 | 4 | 5 |
| 30 | 1 | 2 | 3 | 4 | 5 |
| 35 | 1 | 2 | 3 | 4 | 5 |
| 40 | 1 | 2 | 3 | 4 | 5 |
| 45 | 1 | 2 | 3 | 4 | 5 |
| 50 | 1 | 2 | 3 | 4 | 5 |

Curved Compensation View Map Table

| VL(VNxLN) | M[VL-2] | M[VL-1] | M[VL] | M[VL+2] | M[VL+2] |
|---|---|---|---|---|---|
| 0 | | | 3 | 4 | 5.000014645 |
| 5 | 0.999989009 | 1.999996346 | 3.000004 | 4.000011 | 5.000014523 |
| 10 | 0.999978047 | 1.999992723 | 3.000007 | 4.000022 | 5.00001428 |
| 15 | 0.999967117 | 1.999989131 | 3.000011 | 4.000033 | 5.000013915 |
| 20 | 0.999956216 | 1.999985568 | 3.000015 | 4.000044 | 5.000013428 |
| 25 | 0.999945346 | 1.999982037 | 3.000019 | 4.000055 | 5.00001282 |
| 30 | 0.999934506 | 1.999978536 | 3.000023 | 4.000067 | 5.00001209 |
| 35 | 0.999923697 | 1.999975065 | 3.000026 | 4.000078 | 5.000011239 |
| 40 | 0.999912918 | 1.999971625 | 3.00003 | 4.000089 | 5.000010265 |
| 45 | 0.999902169 | 1.999968215 | 3.000034 | 4.0001 | 5.0000917 |
| 50 | 0.99989145 | 1.999964836 | 3.000038 | 4.000112 | 5.00007954 |

CURVED MULTI-VIEW IMAGE DISPLAY APPARATUS AND CONTROL METHOD THEREOF

CROSS-REFERENCE TO RELATED APPLICATION

This application claims priority from Korean Patent Application No. 10-2014-0091206, filed on Jul. 18, 2014 in the Korean Intellectual Property Office, the entire disclosure of which is hereby incorporated by reference.

BACKGROUND

1. Field

Apparatuses and methods consistent with exemplary embodiments relate to a curved multi-view image display apparatus and a control method thereof, and more particularly, to a curved multi-view image display apparatus that does not require viewer glasses and a control method thereof.

2. Related Art

With the advancement of electronic technologies, various kinds of electronic devices have been developed and distributed. For instance, there have been a number of developments in technologies related to display apparatuses such as a television (TV), which is one of the most used appliances in the home today.

Due to enhancements in performance, display apparatuses can display various types of content. In particular, in recent years, stereoscopic display systems that enable users to view three-dimensional (3D) contents have been developed and distributed.

The stereoscopic display system may be divided into a glasses type system or a non-glasses type system according to whether glasses for viewing a 3D image are used or not. In the glasses-type system, the viewer must wear specialized glasses in order to be able to view the 3D image, whereas the viewer is not required to wear glasses to view the 3D image in the non-glasses type.

An example of the glasses type system is a display apparatus that uses a shutter glasses method. In the shutter glasses method, the display output alternates between an image for the left-eye and an image for the right-eye. The shutter glasses, which are 3D glasses worn by the viewer, are controlled to open and close a left-eye shutter and a right-eye shutter in synchronization with the alternating display of the right-eye image and the left-eye image, such that when the right-eye image is displayed by the display apparatus the left-eye shutter of the glasses is closed. Similarly, when the left-eye image is displayed, the right-eye shutter of the glasses is closed. This alternating output of the left-eye image and the right-eye image allow the viewer to perceive a sense of depth in the viewing image.

The non-glasses type system may be referred to as an autostereoscopy system. 3D display apparatuses that utilize the non-glasses type method display a multi-view image that is optically divided and project light corresponding to images of different views onto the left eye and the right eye of the viewer using parallax barrier technology or a lenticular lens, thereby allowing the viewer to perceive a sense of depth.

When the non-glasses type system has N number of optical views, N number of multi-view images may be generated by performing rendering with respect to an input image and the rendered multi-view images can be provided. However, if the display apparatus has a curved surface (as opposed to a flat surface display), N number of multi-view images are generated and provided in the related-art rendering method, but the light corresponding to the images of different views are not exactly projected onto the left eye and the right eye of the viewer. Therefore, the viewer cannot view a clear image.

FIG. 1 is a view showing a related-art flat multi-view image display apparatus and a related-art curved multi-view image display apparatus.

As shown in FIG. 1, when there are five (5) optical views, the related-art flat multi-view image display apparatus projects light of images corresponding to the respective optical views, and thus a viewer has no inconvenience in viewing the image.

The curved multi-view image display apparatus may increase a sense of immersion of the viewer. However, when there are five (5) optical views as shown in FIG. 1, the curved multi-view image display apparatus may not exactly project the light of images corresponding to the respective optical views onto the viewer's left eye and right eye, and thus may not provide the viewer with a clear image.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a curved multi-view image display apparatus, which can provide a clear multi-view image as in a flat multi-view image display apparatus, and a control method thereof.

According to an aspect of an exemplary embodiment, there is provided an image display apparatus including: a display panel that has a curvature, wherein the display panel includes a plurality of sub-pixels; a viewing zone divider provided in front of the display panel and configured to divide a viewing zone and provide a plurality of optical views; a renderer configured to render a multi-view image to be output to the display panel; and a controller configured to determine a rendering pitch for each of the plurality of optical views based on the curvature of the display panel, and control the renderer so that at least some of the plurality of sub-pixels to output a pixel value corresponding to a plurality of views of the multi-view image based on the determined rendering pitch.

The viewing zone divider may include a lenticular lens, and the controller may be configured to determine a rendering pitch corresponding to a first optical view of the multi-view image based on an angle that is formed by a center of the lenticular lens and the first optical view, and determine a rendering pitch corresponding to a second optical view of the multi-view image based on an angle that is formed by the center of the lenticular lens and the second optical view.

The viewing zone divider may be implemented by using a parallax barrier, and the controller may be configured to determine a rendering pitch corresponding to a first optical view of the multi-view image based on an angle that is formed by a center of an adjacent barrier slit of the parallax barrier and the first optical view, and determine a rendering pitch corresponding to a second optical view of the multi-view image based on an angle that is formed by the center of the adjacent barrier slit and the second optical view of the parallax barrier.

The controller may be configured to determine a rendering pitch by using distance information between the viewing zone divider and a first optical view of the multi-view image based on the curvature of the display panel, and determine a rendering pitch using a distance between the viewing zone divider and a second optical view of the multi-view image.

The controller may be configured to control the renderer so that at least some of the plurality of sub-pixels to output a third pixel value that is calculated from a first pixel value of a first multi-view image and a second pixel value of a second multi-view image.

The controller may be configured to calculate the third pixel value based on a mixing ratio of the first pixel value and the second pixel value, wherein the mixing ratio is determined based on the rendering pitch.

The viewing zone divider may be implemented by using a lenticular lens, and a pitch of the lenticular lens may be determined by the following equation:

$$P2 = \theta \times L2 \times \frac{2\pi}{360}$$

where $$\theta = P1 \times VN \times \frac{360}{2\pi(L1 + L2)},$$

P2 is the pitch of the lenticular lens, θ is an angle formed by a lenticular lens located at a center from an optical view located at a center and an adjacent lenticular lens, L1 is a distance between the display panel and the viewing zone divider, L2 is an optimum viewing distance of the multi-view image, P1 is a rendering pitch, and VN is an odd number of views of the multi-view image.

The viewing zone divider may be implemented by using a lenticular lens, and a rendering pitch which changes for each of the lenticular lenses may be determined by the following equation:

$$\theta = P1 \times VN \times LN \times \frac{360}{2\pi(L1 + L2)}$$

$$x = L2 \times \sin\theta$$

$$y = L2 \times \cos\theta$$

$$\beta[-n] = \theta + \tan^{-1}\left(\frac{nVW - x}{y}\right)(x < nVW)$$

$$= \theta - \tan^{-1}\left(\frac{x - nVW}{y}\right)(x \geq nVW)$$

$$\beta[+n] = \tan^{-1}\left(\frac{x + nVW}{y}\right) - \theta$$

$$D[\pm n] = \tan\beta[\pm n] \times L1$$

where P1 is a rendering pitch, VN is an odd number of optical views, LN is an integer that indicates how far away each lenticular lens is from a lenticular lens located at a center, L1 is a distance between the display panel and the viewing zone divider, L2 is an optimum viewing distance of the multi-view image, 0 is an angle formed by an LN-th lenticular lens from an optical view located at a center and the lenticular lens located at the center, x and y are variables for ease of calculation, n is an integer from 1 to VN/2−1 that indicates how far each of the other optical views are away from the optical view located at the center, VW is a distance between both eyes of a viewer of the multi-view image, β is an angle formed by an optical view located at the center from the LN-th lenticular lens and the other optical views, and D is the changed rendering pitch.

An empty space may be formed between the display panel and the viewing zone divider.

A distance between the display panel and the viewing zone divider, which corresponds to the empty space, may be determined by the following equation:

$$D = T_s/R_s$$

where D is the distance, $T_s$ is thickness of a spacer, and $R_s$ is an index of refraction of the spacer.

The curved multi-view image display apparatus may further include a sensor configured to detect locations of eyes of a viewer, and the controller may be configured to compensate for the rendering pitch based on the locations of the eyes of the viewer detected by the sensor.

The controller may be configured to control at least some of the sub-pixels to output pixel values of at least a first multi-view image and a second multi-view image that are mixed in accordance with the determined rendering pitch.

According to an aspect of another exemplary embodiment, there is provided a control method of an image display apparatus, the method including: rendering a multi-view image to be output; determining a rendering pitch for each of a plurality of optical views of a multi-view image based on a curvature of a display panel of the image display apparatus; and outputting, by at least some of a plurality of sub-pixels of the display panel, a pixel value corresponding to a plurality of views of the multi-view image based on the determined rendering pitch.

The determining the rendering pitch may include: determining a rendering pitch corresponding to a first optical view of the multi-view image based on an angle that is formed by a center of a lenticular lens and the first optical view; and determining a rendering pitch corresponding to a second optical view of the multi-view image based on an angle that is formed by the center of the lenticular lens and the second optical view.

The determining the rendering pitch may include: determining a rendering pitch corresponding to a first optical view of the multi-view image based on an angle that is formed by a center of an adjacent barrier slit and the first optical view of the multi-view image; and determining a rendering pitch corresponding to a second optical view of the multi-view image based on an angle which is formed by the center of the adjacent barrier slit and the second optical view.

The determining the rendering pitch may include: determining a rendering pitch based on a distance between a viewing zone divider and a first optical view of the multi-view image and the curvature, and determining a rendering pitch based on a distance between the viewing zone divider and a second optical view of the multi-view image.

The method may further include detecting locations of eyes of a viewer of the image display apparatus, and compensating for the rendering pitch based on the locations of the eyes of the user detected by the sensor.

The outputting the pixel value may include controlling at least some of the plurality of sub-pixels to output a third pixel value that is determined from a first pixel value of a first multi-view image and a second pixel value of a second multi-view image.

The outputting the pixel value may include controlling at least some of the sub-pixels to output pixel values of at least a first multi-view image and a second multi-view image that are mixed in accordance with the determined rendering pitch.

BRIEF DESCRIPTION OF THE DRAWINGS

The above and/or other aspects will be more apparent by describing in detail exemplary embodiments, with reference to the accompanying drawings, in which:

FIGS. 8 and 9 are charts that illustrate calculation results of a rendering pitch compensation according to an exemplary embodiment;

DETAILED DESCRIPTION

Figure 1:
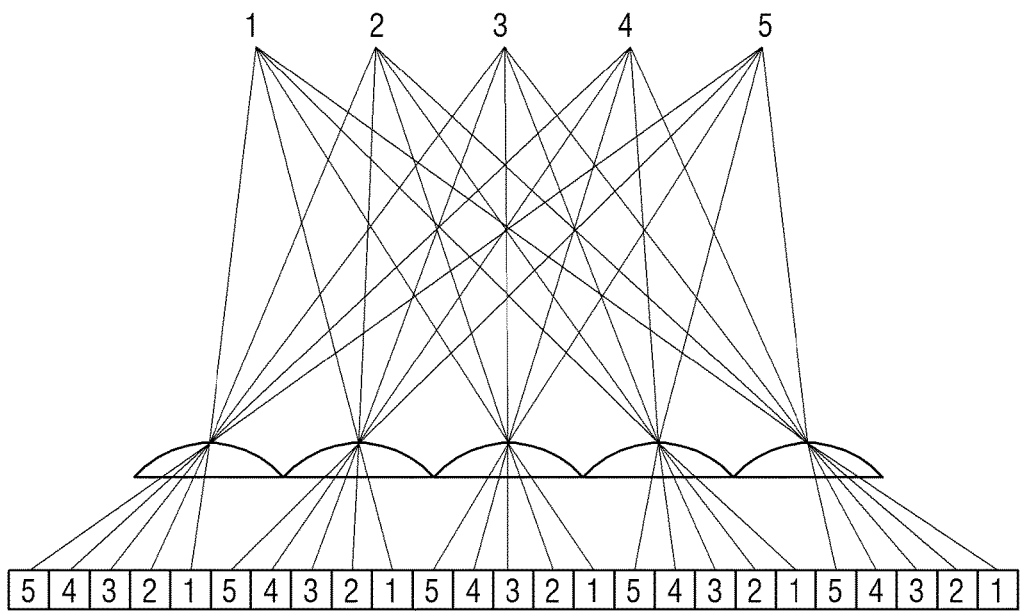
FIG. 1 is a view showing a related-art flat multi-view image display apparatus and a related-art curved multi-view image display apparatus.
Figure 1:
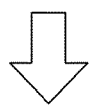
Figure 1:
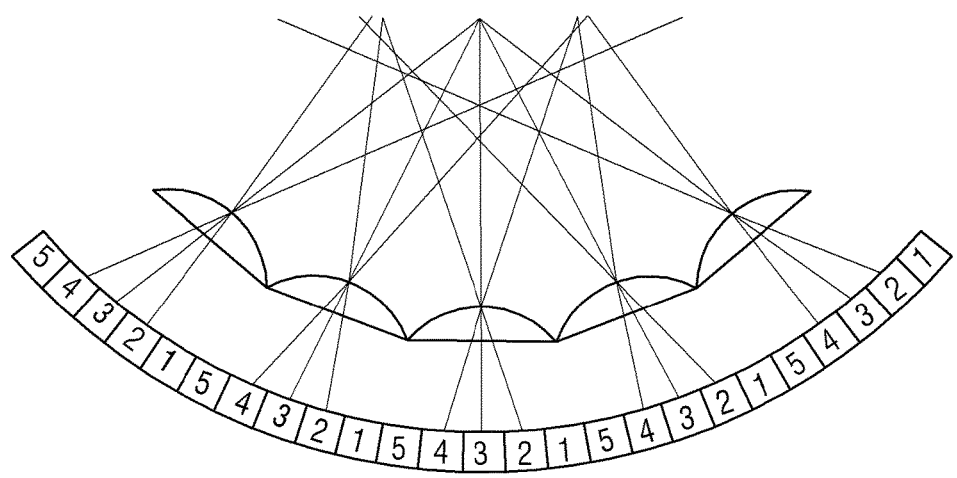

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Figure 2:
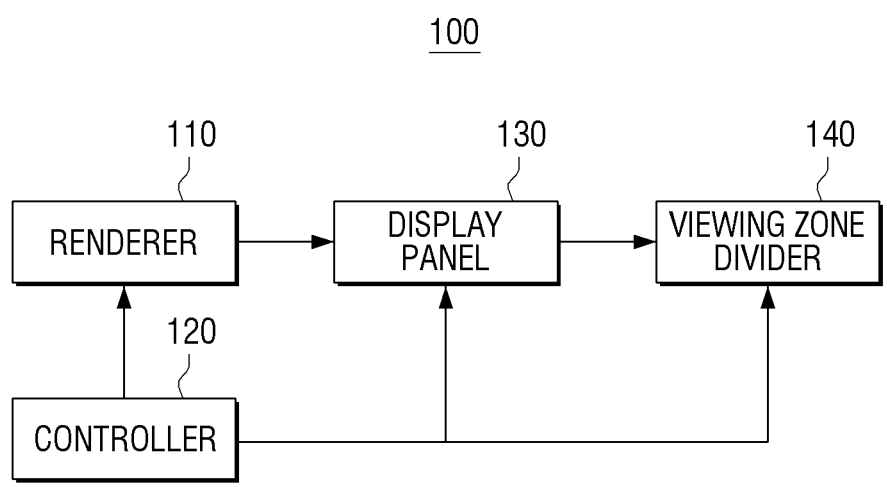
FIG. 2 is a block diagram showing a configuration of a curved multi-view image display apparatus according to an exemplary embodiment.

FIG. 2 is a block diagram showing a configuration of a curved multi-view image display apparatus 100 according to an exemplary embodiment.

The curved multi-view image display apparatus 100 includes a renderer 110 to provide multiple views, a display panel 130, a viewing zone divider 140, and a controller 120.

The curved multi-view image display apparatus 100 may be implemented by using various kinds of display apparatuses such as a TV, a monitor, a personal computer (PC), a kiosk, a tablet PC, an electronic album, a mobile phone, and the like.

The curved multi-view image display apparatus 100 receives an input of an image. Specifically, the curved multi-view image display apparatus 100 may receive an input of an image from various external devices such as an external storage medium, a broadcasting station, a web server, and the like. The input image may be a single view image, a stereoscopic image, or a multi-view image. A single view image is an image that is photographed by a general photographing device. A stereoscopic image is a 3D video image that is expressed by separate images for the left-eye and the right-eye, and is photographed by a stereoscopic photographing device. A stereoscopic photographing device is commonly equipped with two lenses and used to photograph a stereoscopic image. In addition, a multi-view image refers to a 3D video image that is generated by geometrically correcting images photographed by one or more photographing devices and spatially combining the images, which provides various views of diverse directions to a viewer.

In addition, the curved multi-view image display apparatus 100 may receive depth information of the image. It is common that the depth of an image is a depth value given to each of the pixels of the image. For example, a depth of 8 bits may have grayscale values ranging from 0 to 255. When black/white is used as a reference, black (low value) may indicate a place which is far away from the viewer, and white (high value) may indicate a place which is close to the viewer.

The depth information is information indicating the depth of a 3D image, and corresponds to a degree of binocular disparity between the left-eye image and the right-eye image of the 3D image. The sense of depth that a person perceives varies according to the depth information. That is, when the depth is great, the binocular disparity between the left eye and the right eye increases and thus the sense of depth the viewer perceives increases. When the depth is small, the binocular disparity between the left eye and the right eye decreases and thus the sense of depth the viewer perceives decreases. The depth information may be acquired by a passive method, which uses only two-dimensional (2D) characteristics of an image such as stereo matching, or an active method, which uses a device like a depth camera. The depth information may be in a depth map format. The depth map refers to a table which contains depth information for each area of the image.

The renderer 110 may render a multi-view image using the image depth of which has been adjusted in a depth adjuster. In the case of a 2D image, the renderer 110 may render the multi-view image based on depth information that is extracted for 2D/3D conversion. In addition, when multiple views, that is, N number of views, and N number of pieces of corresponding depth information are input, the renderer 110 may render the multi-view image based on at least one of the N number of views and at least one piece of the depth information. In addition, when only N number of views are input, the renderer 110 may extract depth information from the N number of views and then render the multi-view image based on the extracted depth information.

However, the above-described operation of the renderer 110 is merely an example, and the renderer 110 may render the multi-view image in various methods, in addition to the above-described operation.

The display panel 130 may be formed in a curved shape. In particular, the display panel 130 may be formed in a curved shape while maintaining a uniform curvature. As the display panel 130 is formed in a curved shape, the viewing zone divider 140 and a backlight unit may also be formed in a curved shape.

The display panel 130 includes a plurality of pixels each including a plurality of sub-pixels. The sub-pixels may formed of red (R), green (G), and blue (B) elements. That is, each of the pixels in the display panel 130 each include R, G, and B sub-pixels, and the pixels are arranged in a plurality of rows and a plurality of columns, thereby forming the display panel 130. In this case, the display panel 130 may be implemented by using various display units, such as a Liquid Crystal Display (LCD) panel, a Plasma Display Panel (PDP), an Organic Light Emitting Diode (OLED), a Vacuum Fluorescent Display (VFD), a Field Emission Display (FED), an Electro Luminescence Display (ELD), and the like.

The display panel 130 displays image frames or video content. Specifically, the display panel 130 may display the rendered image in which a plurality of images of different views are arranged serially and repeatedly.

In the case in which the display panel 130 is implemented with an LCD panel, the curved multi-view image display apparatus 100 may further include a backlight unit to supply a backlight to the display panel 130, and a panel driver to drive the pixels of the display panel 130 according to pixel values of the respective pixels constituting the image frame.

The viewing zone divider 140 may be disposed on the front surface of the display panel 130 to provide a different view for each viewing area, that is, multiple views. In this case, the viewing zone divider 140 may be implemented by using a lenticular lens or a parallax barrier.

When the viewing zone divider 140 is implemented by using the lenticular lens including a plurality of lens areas, the lenticular lens may refract the image that is displayed on the display panel 130 through the plurality of lens areas. Each of the lens areas is formed in a size corresponding to at least one pixel and may distribute light passing through each pixel differently according to a viewing area.

In the case of the lenticular lens method, the curved multi-view image display apparatus 100 may further include a lens unit. The lens unit may include a substrate, an electrode, a liquid crystal layer, and a medium layer. The lens unit may change the optical characteristics based on whether an electric field is applied by the electrode, and control the refraction of light corresponding to the multi-view image passing through the lens unit.

In addition, when the viewing zone divider 140 is implemented with a parallax barrier, the parallax barrier may be implemented by a transparent slit array including a plurality of barrier areas. Accordingly, light is blocked by the slit formed between the barrier areas and an image of a different view for each viewing area is projected.

The viewing zone divider 140, which is formed of the lenticular lens or parallax barrier, may be inclined by a predetermined angle to enhance image quality. That is, the viewer may view an area which is inclined in a specific direction, rather than viewing an area of a vertical or horizontal direction. Accordingly, the viewer may view a part of the sub-pixel rather than viewing the entirety of the single sub-pixel. For example, when the viewer views an image of view number one with the right eye and views an image of view number two with the left eye in FIGS. 10 to 12, the viewer views an area 10 corresponding to the number one view with the right eye and views an area 20 corresponding to the number two view with the left eye. That is, the viewer may view a part of the sub-pixel rather than the entirety of the single sub-pixel.

The controller 120 may change a rendering pitch for each of a plurality of optical views based on a predetermined curvature, and may control the renderer 110 to allow at least some of the plurality of sub-pixels to output a pixel value corresponding to a plurality of multi-view images based on the changed rendering pitch. The rendering pitch described herein refers to the number of sub-pixels that serve as a minimum unit for rendering one of the plurality of multi-view images. For example, in the case of displaying multi-view images with six different views (view number one to view number six) that are displayed in six (6) sub-pixels, the minimum rendering unit for one view image (e.g., view number one) is displayed in one sub-pixel and thus the rendering pitch is 1. However, in the case of the curved multi-view image display apparatus 100, the rendering pitch is changed and thus a different rendering method is performed. This will be explained in detail.

When the viewing zone divider 140 is implemented by using the lenticular lens, the controller 120 may determine a rendering pitch corresponding to each of the optical views based on an angle which is formed by the center of the lenticular lens and each of the optical views. In addition, when the viewing zone divider 140 is implemented by using the parallax barrier, the controller 120 may determine a rendering pitch corresponding to each of the optical views based on an angle which is formed by the center of an adjacent barrier slit and each of the optical views. Further, the controller 120 may determine a rendering pitch using distance information between the viewing zone divider 140 and each of the optical views based on a predetermined curvature. Specifically, the process of determining the rendering pitch by the controller 120 will be explained below in detail.

The controller 120 may control the renderer 110 such that at least some of the plurality of sub-pixels output a third pixel value, which is calculated based on a first pixel value of a first multi-view image and a second pixel value of a second multi-view image. In this case, the controller 120 may calculate the third pixel value based on a mixing ratio of the first pixel value and the second pixel value, which is determined based on the rendering pitch.

The curved multi-view image display apparatus 100 may further include a sensor that is capable of detecting the location of both eyes of a user that views the display apparatus. In this case, the controller 120 may change the rendering pitch based on the locations of both eyes of a user that are detected by the sensor.

Figure 3:
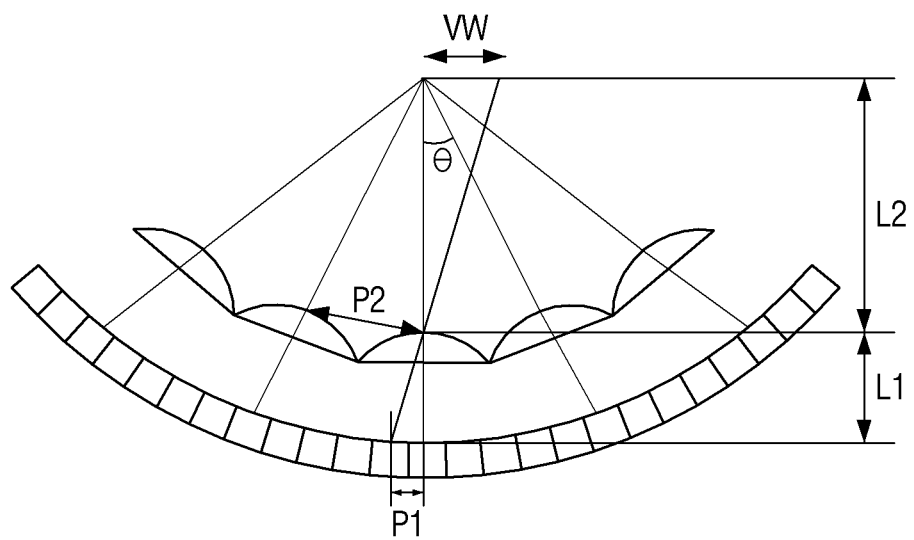
FIG. 3 is a view that illustrates a method for obtaining a pitch of a lenticular lens according to an exemplary embodiment.

FIG. 3 is a view that illustrates a method for obtaining a pitch of a lenticular lens according to an exemplary embodiment.

The pitch of the lenticular lens refers to a distance between adjacent lenticular lenses of the plurality of lenticular lenses, and may be calculated based on a relational equation of the central angle and the arc of a sector in FIG. 3 as in Equation 1 presented below:

$$\theta = P1 \times VN \times \frac{360}{2\pi(L1 + L2)}$$
$$P2 = \theta \times L2 \times \frac{2\pi}{360}$$

Equation 1

Here, P2 is a pitch of a lenticular lens, θ is an angle formed by a lenticular lens located at the very center of the optical view located at the very center and an adjacent lenticular lens, L1 is a distance between the display panel 130 and the viewing zone divider 140, L2 is an optimum viewing distance, P1 is a rendering pitch, and VN is the odd number of views. Since P1 and P2 correspond to the arc of the sector in view of Equation 1, they may have a small error in comparison with the pitch of the lenticular lens indicating a straight-line distance. However, this error may be disregarded since the pitch of the lenticular lens and the rendering pitch are very small.

Although the method for obtaining the pitch of the lenticular lens is described in FIG. 3, the corresponding method may be applied not only to the viewing zone divider implemented by using the lenticular lens, but also to the viewing zone divider implemented by using the parallax barrier.

Figure 4:
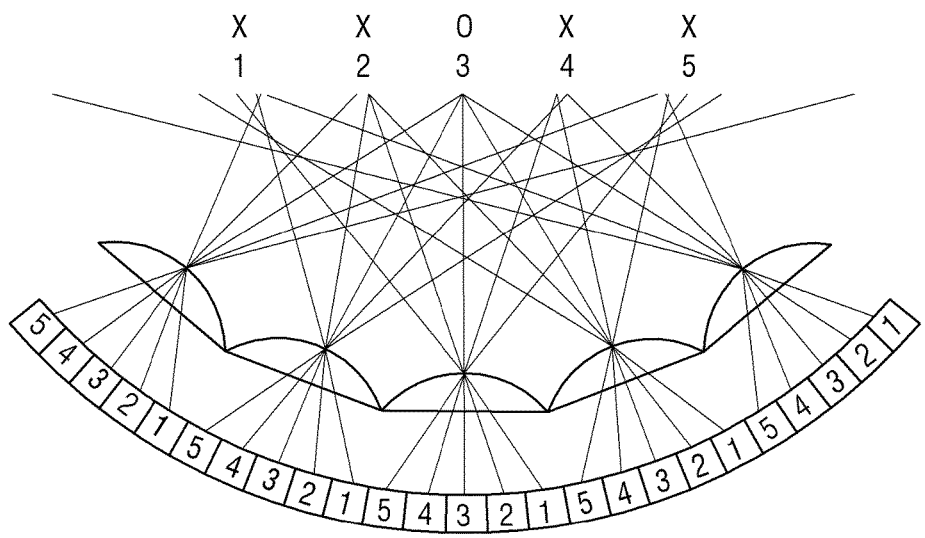
FIG. 4 is a view that illustrates a problem that light of images corresponding to optical views is not projected in a curved multi-view image display apparatus.
Figure 4:
Figure 4:
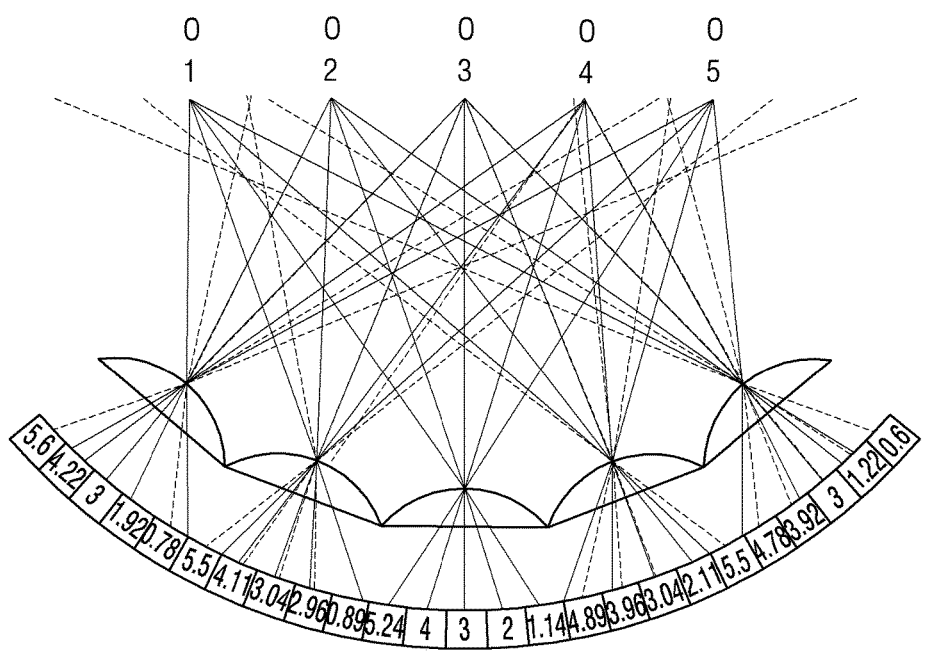

FIG. 4 is a view that illustrates a problem in which light of images corresponding to optical views is not projected in the curved multi-view image display apparatus 100 to assist in the understanding of the present disclosure.

Referring to FIG. 4, it is assumed that there are five (5) optical views and the pitch of the lenticular lens is determined according to Equation 1. Since the multi-view image display apparatus is implemented in a curved shape, the pitch of the lenticular lens may be determined according to Equation 1 such that light of an image corresponding to the optical view located at the very center (i.e., view number three in the upper drawing) is projected correctly. However, light of images corresponding to the other optical views (i.e., views number one, two, four, and five) is not projected correctly. Therefore, since the light of the images corresponding to the optical views other than the optical view located at the very center (view number three) is not projected correctly, the display apparatus cannot provide a clear image to the viewer when the viewer views a multi-view image.

The lower drawing of FIG. 4 shows a condition for projecting light of images corresponding to the respective optical views. That is, in order to exactly project light of images corresponding to the respective optical views, the rendering pitch values may vary. A detailed description thereof will be provided below.

Figure 5:
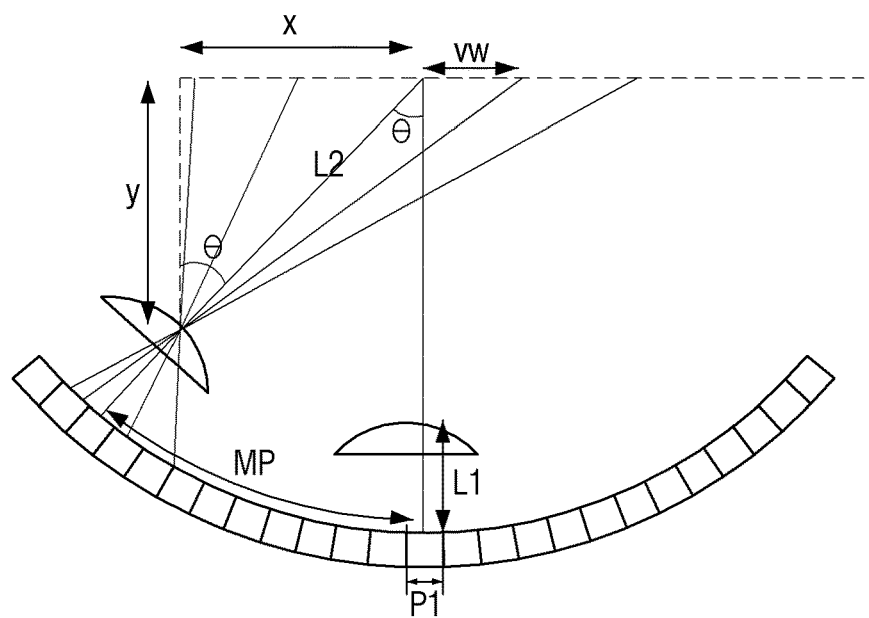
FIG. 5 is a view that illustrates a method for obtaining a changed rendering pitch for each lenticular lens according to an exemplary embodiment.
Figure 5:
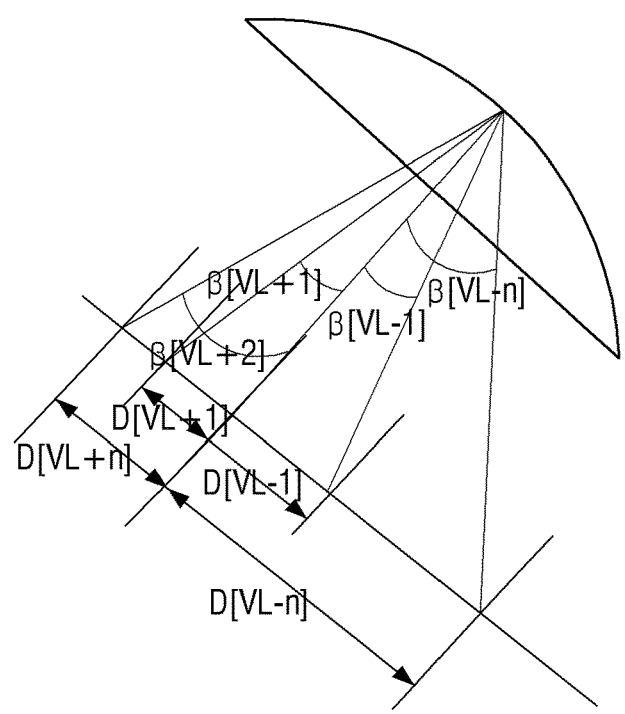

FIG. 5 is a view that illustrates a method for obtaining a changed rendering pitch for each of the lenticular lenses according to an exemplary embodiment.

In FIG. 5, Equation 2 may be established by using a trigonometric function in relation to a changed rendering pitch, as presented below. The changed rendering pitch for each of the lenticular lenses may be calculated according to Equation 2:

$$\theta = P1 \times VN \times LN \times \frac{360}{2\pi(L1 + L2)} \quad \text{Equation 2}$$

$$x = L2 \times \sin\theta$$

$$y = L2 \times \cos\theta$$

$$\beta[-n] = \theta + \tan^{-1}\left(\frac{nVW - x}{y}\right)(x < nVW)$$

$$= \theta - \tan^{-1}\left(\frac{x - nVW}{y}\right)(x \geq nVW)$$

$$\beta[+n] = \tan^{-1}\left(\frac{x + nVW}{y}\right) - \theta$$

$$D[\pm n] = \tan\beta[\pm n] \times L1$$

Herein, P1 is a rendering pitch, VN is the odd number of optical views, LN is an integer which indicates how far each of the other lenticular lens are away from the lenticular lens located at the center, L1 is a distance between the display panel 130 and the viewing zone divider 140, L2 is an optimum viewing distance, $\theta$ is an angle formed by the LN-th lenticular lens from the optical view located at the very center and the lenticular lens located at the very center, x and y are variables for ease of calculation, n is an integer from 1 to VN/2−1 and indicates how far each of the other optical views are away from the optical view located at the center, VW is a distance between both eyes of a viewer, $\beta$ is an angle formed by an optical view located at the very center from the LN-th lenticular lens and the other optical views, and D is a changed rendering pitch.

Figure 6:
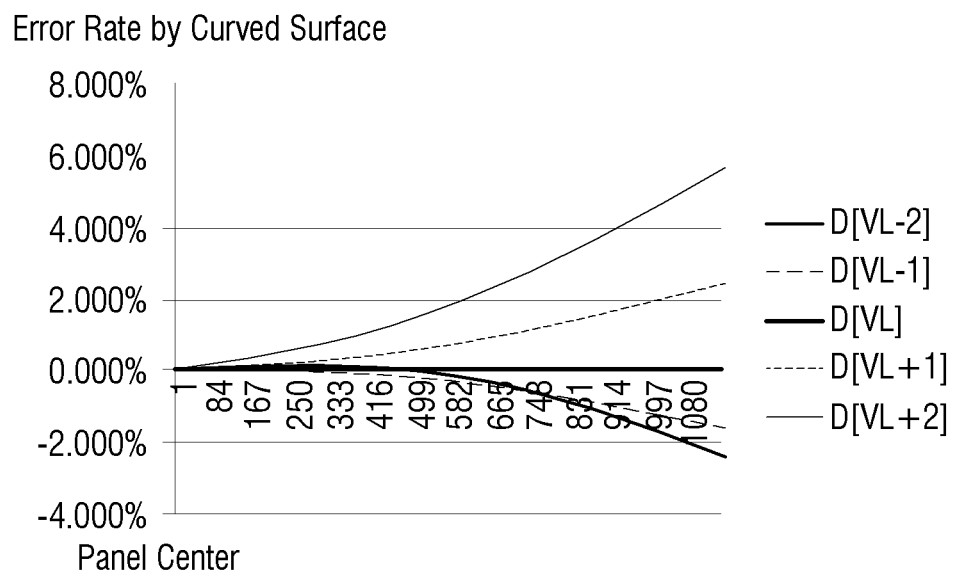
FIG. 6 is a graph that illustrates an error rate of a changed rendering pitch according to an exemplary embodiment.

The changed rendering pitch obtained by Equation 2 has an error rate for an existing rendering pitch, which is depicted graphically in FIG. 6.

According to the graph of FIG. 6, the error increases as a distance from the lenticular lens located at the very center of the curved multi-view image display apparatus 100 increases. In addition, even the optical views located at the same location from the optical view located at the very center may have different error rates. Therefore, when the rendering pitch is changed, the change of the rendering pitch may be symmetrical vertically with reference to the lenticular lens located at the very center. However, regarding the lenticular lenses that are not located at the very center, the change value of the rendering pitch between the optical views symmetrical with reference to the optical view located at the very center is not symmetrical. A rendering pitch compensation algorithm will be explained below with reference to FIG. 7.

Figure 7:
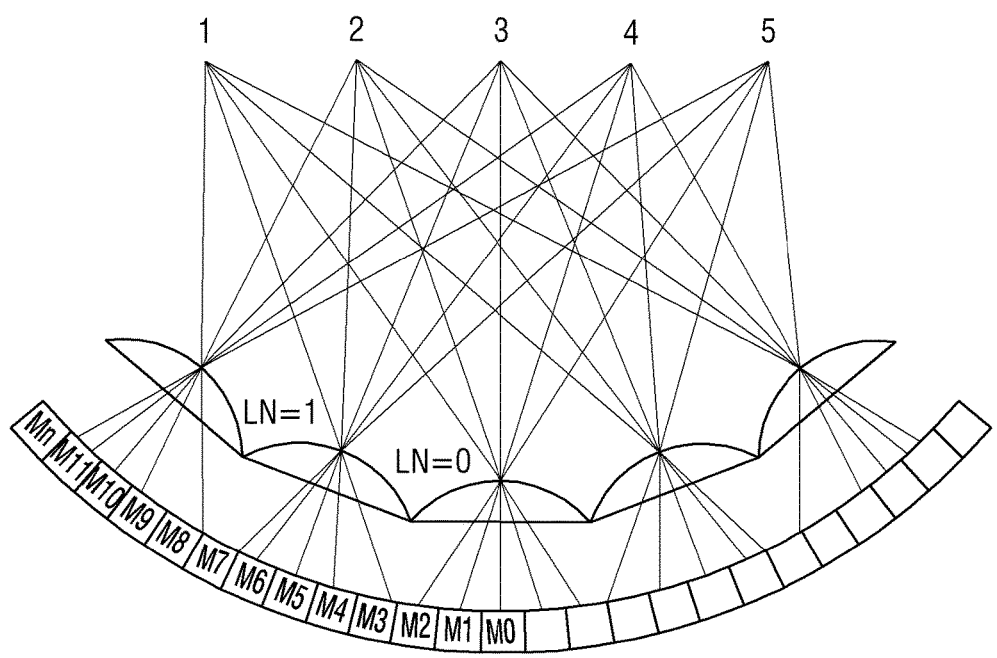
FIG. 7 is a view that illustrates a compensation algorithm of a rendering pitch for each lenticular lens according to an exemplary embodiment.

FIG. 7 is a view to explain an algorithm for compensating for a rendering pitch for each lenticular lens according to an exemplary embodiment.

The compensated rendering pitch determined based on the compensation algorithm may be calculated by Equation 3 presented below:

$$D'[\pm n] = CV - \frac{D[\pm n]}{P1} \quad \text{Equation 3}$$

$$M = CV + ((CV + 1) - D'[+1])$$

$$M[\pm n] = D'[\pm n] + ((CV - n + 1) - D'[\pm n + 1])$$

if $n = CV - 1$ $$M[+n] = D'[+n] + (1 - D'[1 - CV])$$

Herein, CV is an integer value to which the result of VN/2 is rounded off, VN is the odd number of optical views, n is an integer from 1 to CV-1 and indicates how far each of the other optical views are away from the optical view located at the very center, D is a changed rendering pitch, P1 is a rendering pitch, D' is a variable for ease of calculation, and M is a compensated rendering pitch.

Figure 9:

A result of calculations using Equation 3 may be represented as shown in FIGS. 8 and 9, on the assumption that P1=0.105 mm, VW=63 mm, the number of views (VN) is 5, L1 is 5 mm, and L2 is 3000 mm.

Figure 10:
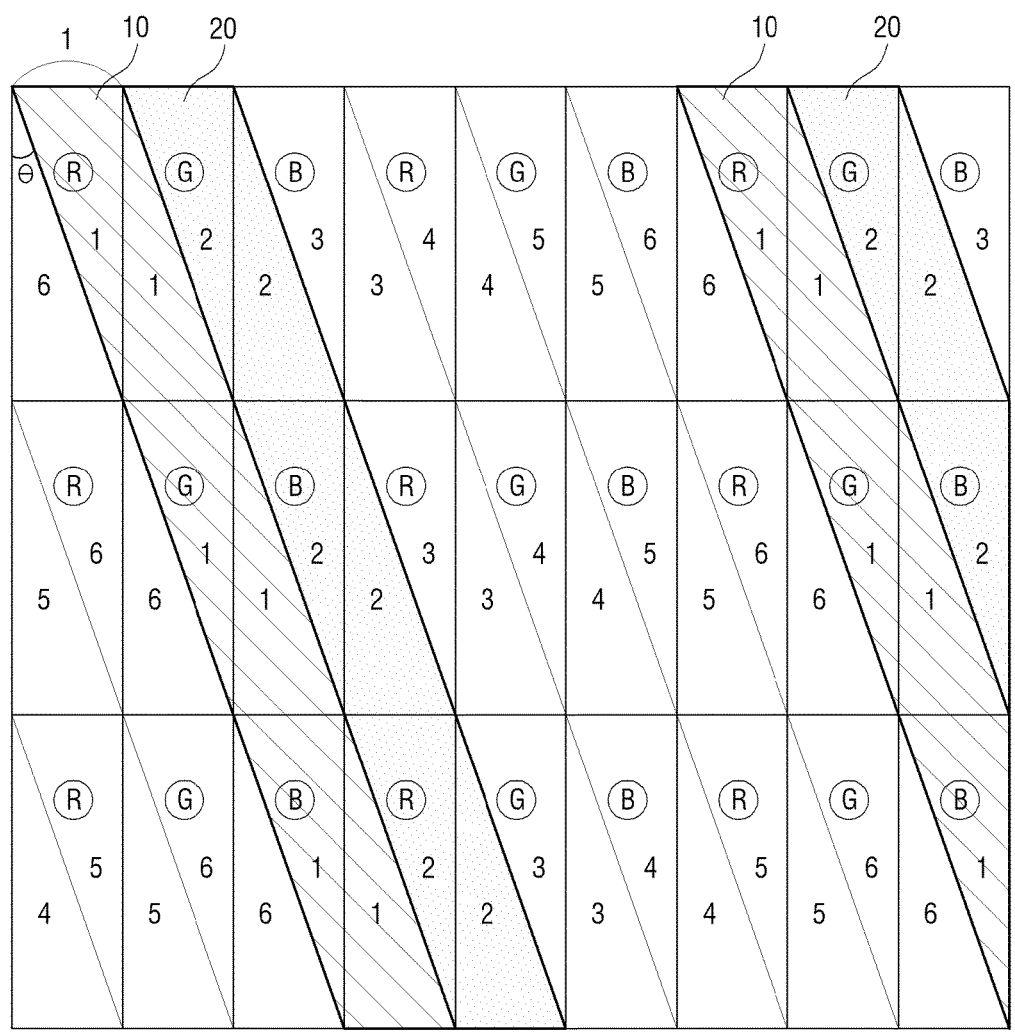
FIGS. 10, 11 and 12 are views that illustrate a rendering method according to an exemplary embodiment.
Figure 11:
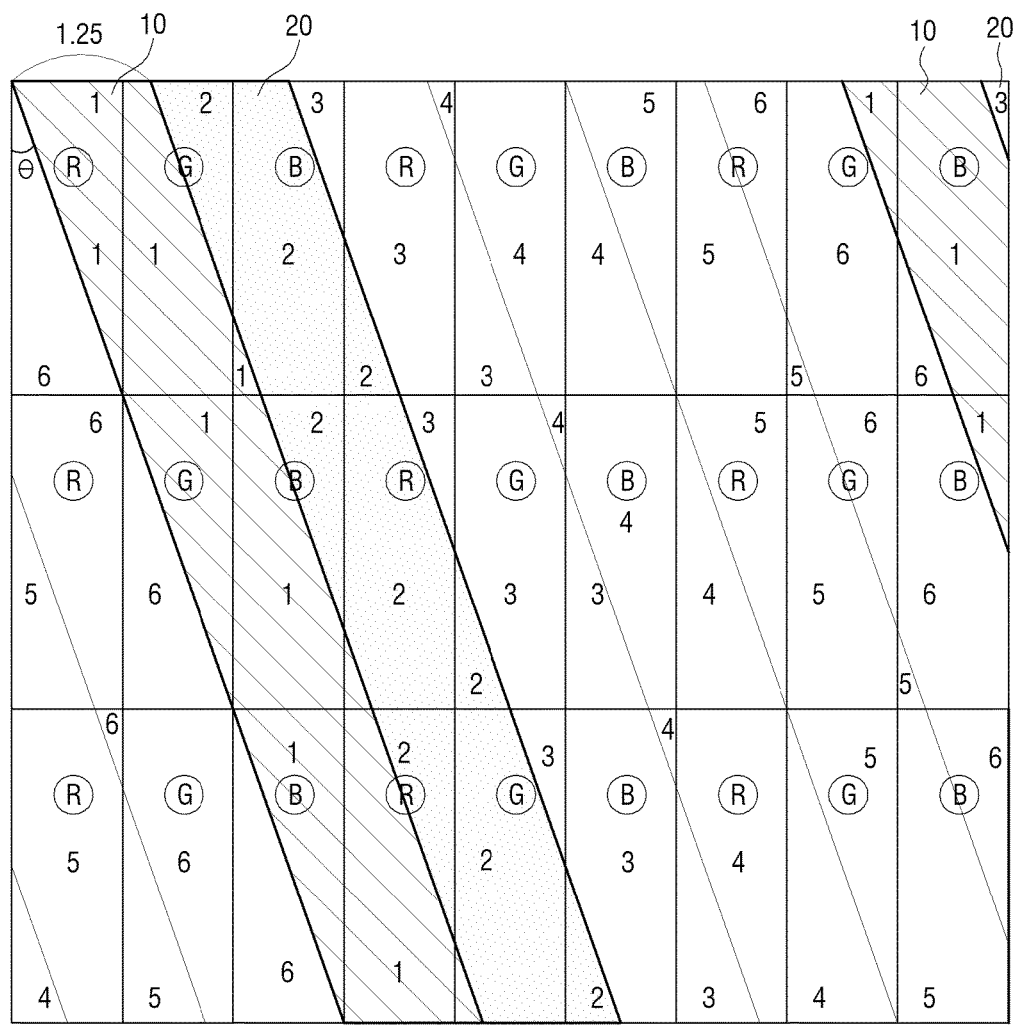
Figure 12:
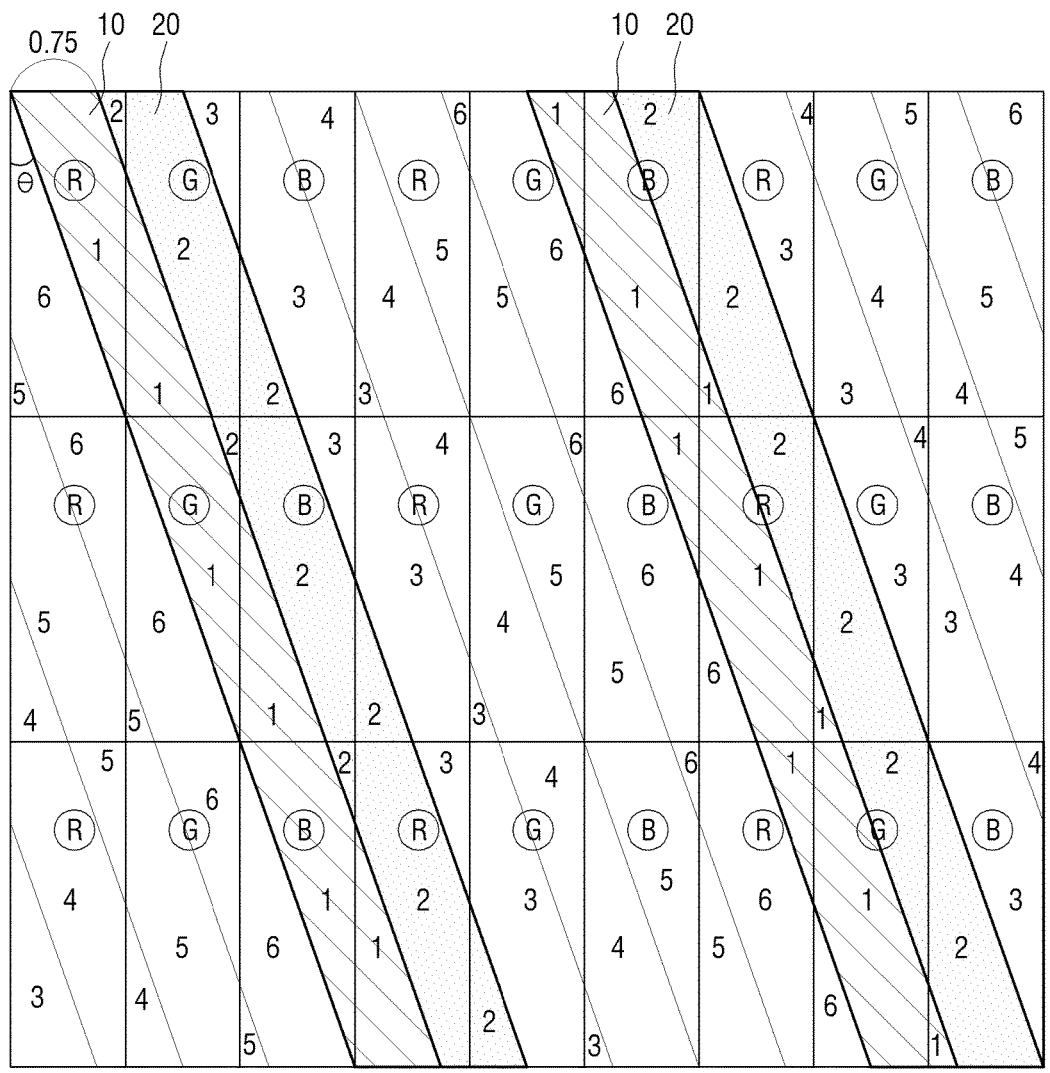

FIGS. 10, 11 and 12 are views to illustrate a rendering method according to an exemplary embodiment in which a multi-view image having six views is displayed. In particular, FIG. 10 is a view to illustrate a rendering method when the rendering pitch is 1. Referring to FIG. 10, the first sub-pixel of the first row may output a pixel value in which the view number six (6) image and the view number one (1)-view image are mixed. The second sub-pixel of the first row may output a pixel value in which the view number one (1) image and the view number two (2) image are mixed.

The pixel value of each of the sub-pixels may be determined based on the rendering pitch, and accordingly, may be determined based on an area occupied by each view in a single pixel. When the rendering pitch is determined to be 1, the ratio of the area occupied by the view number six (6) image to the area occupied by the view number one (1) image in the first sub-pixel is 1:1. Therefore, the first sub-pixel may calculate the pixel value in which an R value of the view number one (1) image and an R value of the view number six (6) image are mixed at the ratio of 1:1.

FIG. 11 is a view to illustrate a rendering method when the rendering pitch is greater than 1. Referring to FIG. 8, the first sub-pixel of the first row may output a pixel value in which the view number six (6) image and the view number one (1) image are mixed. The second sub-pixel of the first row may output a pixel value in which the view number one (1) image and the view number two (2) image are mixed. In addition, the third sub-pixel of the first row may output a pixel value in which the view number one (1) image, the view number two (2) image, and the view number three (3) image are mixed.

The pixel value of each of the sub-pixels is determined based on the rendering pitch. When the rendering pitch is determined to be 1.25 as shown in FIG. 11, the ratio of the area occupied by the view number one (1) image to the area occupied by the view number two (2) image in the second sub-pixel is 23:9. Therefore, the second sub-pixel may calculate the pixel value in which a G value of the view number one (1) image and a G value of the view number two (2) image are mixed at the ratio of 23:9.

FIG. 12 is a view to illustrate a rendering method when the rendering pitch is smaller than 1. Referring to FIG. 12, the first sub-pixel of the first row may output a pixel value in which the view number five (5) image, the view number six (6) image, the view number one (1) image, and the view number two (2) image are mixed. The second sub-pixel of the first row may output a pixel value in which the view number one (1) image, the view number two (2) image, and the view number three (3) image are mixed. In addition, the third sub-pixel of the first row may output a pixel value in which the view number two (2) image, the view number three (3) image, and the view number four (4) image are mixed.

The pixel value of each of the sub-pixels is determined based on the rendering pitch. When the rendering pitch is determined to be 0.75 as shown in FIG. 12, the ratio of the area occupied by the view number one (1) image to the area occupied by the view number two view image to the area occupied by the view number three (3) image in the second sub-pixel is 9:19:4. Therefore, the second sub-pixel may calculate the pixel value in which a G value of the view number one (1) image, a G value of the view number two (2) image, and a G value of the view number three (3) image are mixed at the ratio of 9:19:4.

In FIGS. 10 to 12, the multi-view image has six views in total. However, this is merely an example, and the method may be equally applied when the multi-view image has 2 views, 4 view, 9 views, 18 views, 30 views, 36 views, or other number of views.

In FIGS. 10 to 12, the intervals of the images which are rendered according to the rendering pitch are uniform. However, according to an exemplary embodiment, the respective multi-view images may be rendered at different intervals. In addition, the rendering method in FIGS. 10 to 12 is merely an example and other methods may be implemented.

Figure 13:
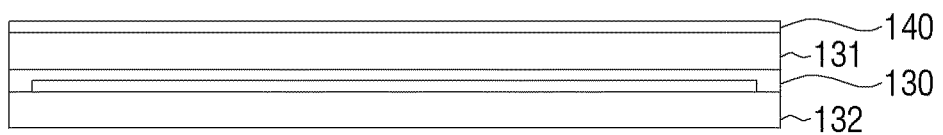
FIGS. 13 and 14 are views that illustrate a problem in the configuration of a multi-view image display apparatus.
Figure 14:
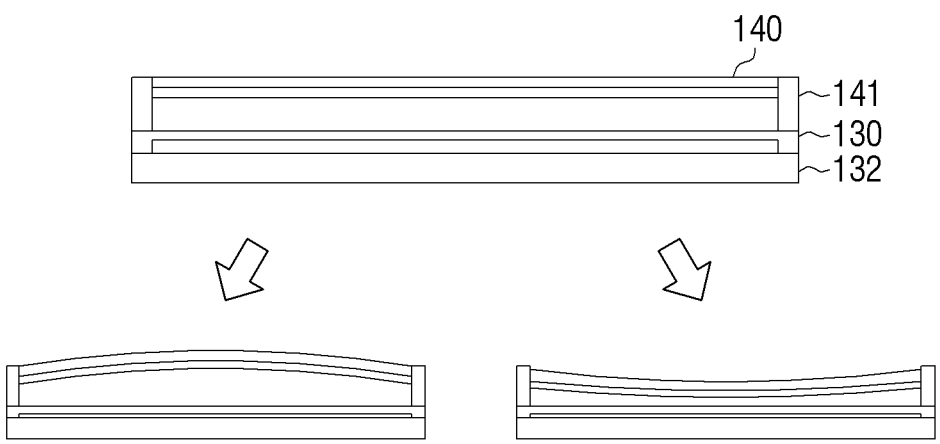

FIGS. 13 and 14 are views to illustrate problems in the configuration of the multi-view image display apparatus to assist in the understanding of the present disclosure.

FIG. 13 illustrates a flat multi-view image display apparatus. However, the same configuration may be applied to the curved multi-view image display apparatus 100, except for the curved shape, and the flat multi-view image display apparatus will be explained for convenience of explanation.

Referring to FIG. 13, the display apparatus includes a display panel 130, a viewing zone divider 140, a spacer 131, and a backlight unit 132.

The backlight unit 132 provides light to the display panel 130. An image formed on the display panel 130 is projected onto the viewing zone divider 140 by the light provided from the backlight unit 132, and the viewing zone divider 140 distributes the light of each image and transmits the light toward a viewer.

The spacer 131 may be used to maintain a constant gap between the display panel 130 and the viewing zone divider 140. The spacer 131 may be made of glass or poly methyl methacrylate (PMMA), and can maintain the constant gap between the display panel 130 and the viewing zone divider 140 but the spacer may increase the weight of the display apparatus. In the case of the curved multi-view image display apparatus 100, using glass or PMMA as material for the spacer 131 may present issues in the manufacturing process as the materials are not easily bendable.

Referring to FIG. 14, the flat multi-view image display apparatus includes the display panel 130, the viewing zone divider 140, and the backlight unit 132, but uses a supporter 141 instead of the spacer 131. The supporter 141 may be made of thin glass or thin PMMA, and may be used to space the display panel 130 and the viewing zone divider 140 apart. In addition, an empty space is formed between the display panel 130 and the viewing zone divider 140 by using supporter 141, and thus the weight of the display apparatus may be reduced as compared to using the spacer 131.

However, in the flat multi-view image display apparatus including the supporter 141, the viewing zone divider 140 is relatively thin in comparison with its area and may gradually become bent. However, the curved multi-view image display apparatus may achieve a more advantageous effect when the supporter 141 is used. This will be explained below with reference to FIG. 15.

Figure 15:
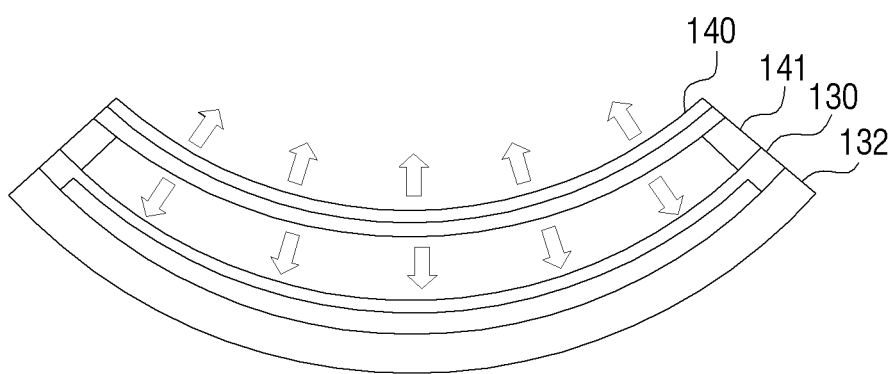
FIG. 15 is a view that illustrates a configuration of a curved multi-view image display apparatus according to an exemplary embodiment.

FIG. 15 is a view that illustrates a configuration of a curved multi-view image display apparatus 100 according to an exemplary embodiment.

Referring to FIG. 15, the curved multi-view image display apparatus 100 includes a display panel 130, a viewing zone divider 140, a supporter 141, and a backlight unit 132. The same elements as in FIGS. 13 and 14 will not be described.

The curved multi-view image display apparatus 100 may not cause the problem described in FIG. 14 even when the display apparatus 100 uses the supporter 141. Specifically, the force would cause the viewing zone divider 140 to return to a flat shape since it is bent is offset because the viewing zone divider 140 is fixed by the supporter 141, and thus, the problem that the display apparatus becomes bent like the flat multi-view image display apparatus does not arise. Therefore, the curved multi-view image display apparatus 100 does not use the spacer 131 and thus can achieve the effect of reducing the manufacturing cost and reducing the weight of the display apparatus, in addition to the effect of enhancing the sense of immersion of the user.

The distance between the display panel 130 and the viewing zone divider 140 may be calculated by Equation 4 presented below:

$$D = T_s / R_s \qquad \text{Equation 4}$$

where D is a predetermined distance, $T_s$ is thickness of the spacer, and $R_s$ is an index of refraction of the spacer.

The index of refraction in the air is 1. Therefore, the index of refraction in the air may be omitted from Equation 4. However, when specific gas is injected between the display panel 130 and the viewing zone divider 140, the equation may be changed partially to account for the index of refraction of the specific gas.

Figure 16:
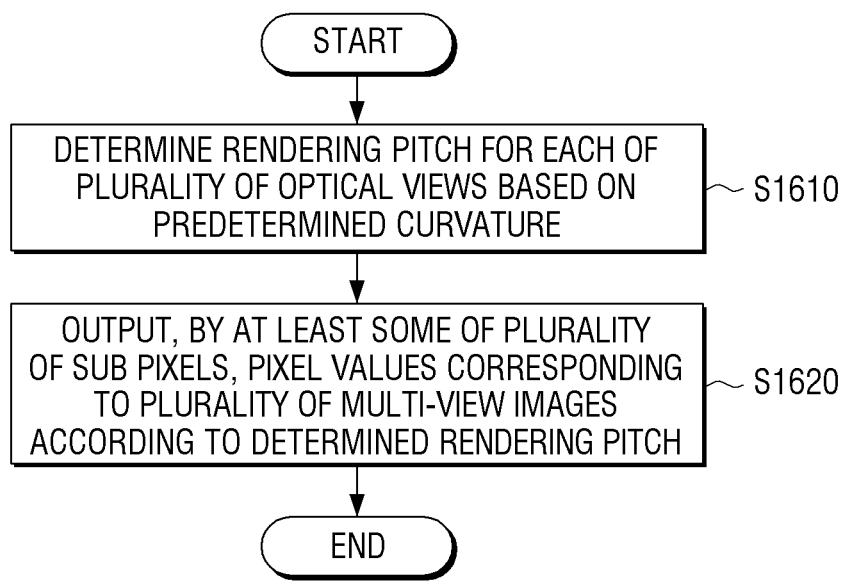
FIG. 16 is a view that illustrates a rendering method of a curved multi-view image display apparatus according to an exemplary embodiment.

FIG. 16 is a view that illustrates a rendering method of a curved multi-view image display apparatus 100 according to an exemplary embodiment.

First, a rendering pitch for each of a plurality of optical views is determined based on a predetermined curvature (S1610). In addition, at least some of a plurality of sub-pixels outputs a pixel value corresponding to a plurality of multi-view images based on the determined rendering pitch (S1620).

The operation of determining the rendering pitch (S1610) may include determining a rendering pitch corresponding to a first optical view based on an angle which is formed by the center of a lenticular lens and the first optical view, and determining a rendering pitch corresponding to a second optical view based on an angle which is formed by the center of the lenticular lens and the second optical view.

In addition, the operation of determining the rendering pitch (S1610) may include determining a rendering pitch corresponding to a first optical view based on an angle which is formed by the center of an adjacent barrier slit and the first optical view, and determining a rendering pitch corresponding to a second optical view based on an angle which is formed by the center of the adjacent barrier slit and the second optical view.

In addition, the operation of determining the rendering pitch (S1610) may include determining a rendering pitch using distance information between the viewing zone divider and the first optical view based on the predetermined curvature, and determining a rendering pitch using distance information between the viewing zone divider and the second optical view.

The operation of outputting the pixel value corresponding to the plurality of multi-view images (S1620) may include outputting, by at least some of the plurality of sub-pixels, a third pixel value that is calculated based on a first pixel value of a first multi-view image and a second pixel value of a second multi-view image.

In addition, the operation of outputting the pixel value corresponding to the plurality of multi-view images (S1620) may include calculating the third pixel value based on a mixing ratio of the first pixel value and the second pixel value, which is determined according to the rendering pitch.

In addition, the display apparatus may detect locations of both eyes of the viewer and may compensate for the rendering pitch based on the locations of the viewer's eyes.

As described above, the curved multi-view image display apparatus 100 can enhance a sense of immersion that a viewer perceives when viewing an image, and can provide a clear image and thus enhance a feeling of satisfaction of the viewer.

The control method of the curved multi-view image display apparatus according to various exemplary embodiments may be implemented as a program code executable by a computer or processor and may be stored in various non-transitory computer readable media and provided to devices to be executed by a processor.

For example, a non-transitory computer readable medium, which stores a program for performing the steps of: determining a rendering pitch for each of a plurality of optical views based on a predetermined curvature, and outputting, by at least some of a plurality of sub-pixels, a pixel value corresponding to a plurality of multi-view images based on the determined rendering pitch, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) storage device, a memory card, and a read only memory (ROM), and may be provided.

The foregoing exemplary embodiments and advantages are merely exemplary and are not to be construed as limiting. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image display apparatus comprising:
   a curved display panel that comprises a plurality of sub-pixels;
   a viewing zone divider provided in front of the curved display panel and configured to provide a plurality of optical views; and
   a controller comprising a processor configured to execute processor-executable instructions to:
      render a multi-view image based on a plurality of images of different views according to a rendering pitch, and
      control the curved display panel to display the multi-view image,
   wherein at least one of the plurality of sub-pixels comprises a plurality of pixel values corresponding to the plurality of images of different views,
   wherein the rendering pitch is determined based on a curvature of the curved display panel, and
   wherein the rendering pitch is a predetermined number of sub pixels included in a unit configured to render one of the plurality of images of different views, and is proportional to a radius of the curvature of the curved display panel and an angle formed between an optical view at a center of the viewing zone divider and each of the plurality of optical views, and inversely proportional to a number of the plurality of optical views.

2. The image display apparatus of claim 1, wherein the viewing zone divider comprises a lenticular lens, and
   wherein the controller is configured to determine a rendering pitch corresponding to a first optical view of the multi-view image based on an angle that is formed by a center of the lenticular lens and the first optical view, and determine a rendering pitch corresponding to a second optical view of the multi-view image based on an angle that is formed by the center of the lenticular lens and the second optical view.

3. The image display apparatus of claim 1, wherein the viewing zone divider comprises a parallax barrier, and wherein the controller is configured to determine a rendering pitch corresponding to a first optical view of the multi-view image based on an angle that is formed by a center of an adjacent barrier slit of the parallax barrier and the first optical view, and determine a rendering pitch corresponding to a second optical view of the multi-view image based on an angle that is formed by the center of the adjacent barrier slit of the parallax barrier and the second optical view.

4. The image display apparatus of claim 1, wherein the controller is configured to determine a rendering pitch by using distance information between the viewing zone divider and a first optical view of the multi-view image based on the curvature of the curved display panel, and determine a rendering pitch using a distance between the viewing zone divider and a second optical view of the multi-view image.

5. The image display apparatus of claim 1, wherein the controller is configured to control at least some of the plurality of sub-pixels to output a third pixel value that is calculated from a first pixel value of a first multi-view image and a second pixel value of a second multi-view image.

6. The image display apparatus of claim 5, wherein the controller is configured to calculate the third pixel value based on a mixing ratio of the first pixel value and the second pixel value, wherein the mixing ratio is determined based on the rendering pitch.

7. The image display apparatus of claim 1, wherein the viewing zone divider comprises a lenticular lens, and
wherein a pitch of the lenticular lens is determined by the following equation:

$$P2 = \theta \times L2 \times \frac{2\pi}{360}$$

where $$\theta = P1 \times VN \times \frac{360}{2\pi(L1 + L2)},$$

P2 is the pitch of the lenticular lens, $\theta$ is an angle formed by the lenticular lens located at a center from an optical view located at the center and an adjacent lenticular lens, L1 is a distance between the curved display panel and the viewing zone divider, L2 is an optimum viewing distance of the multi-view image, P1 is the rendering pitch, and VN is an odd number of the plurality of optical views of the multi-view image.

8. The image display apparatus of claim 1, wherein the viewing zone divider comprises a lenticular lens, and
wherein a changed rendering pitch which for each lenticular lens is determined by the following equation:

$$\theta = P1 \times VN \times LN \times \frac{360}{2\pi(L1 + L2)}$$

$$x = L2 \times \sin\theta$$

$$y = L2 \times \cos\theta$$

$$\beta[-n] = \theta + \tan^{-1}\left(\frac{nVW - x}{y}\right)(x < nVW)$$

$$= \theta - \tan^{-1}\left(\frac{x - nVW}{y}\right)(x \geq nVW)$$

$$\beta[+n] = \tan^{-1}\left(\frac{x + nVW}{y}\right) - \theta$$

$$D[\pm n] = \tan\beta[\pm n] \times L1$$

where P1 is the rendering pitch, VN is an odd number of the plurality of optical views, LN is an integer that indicates how far away each lenticular lens is from a lenticular lens located at a center, L1 is a distance between the curved display panel and the viewing zone divider, L2 is an optimum viewing distance of the multi-view image, $\theta$ is an angle formed by an LN-th lenticular lens from an optical view located at a center and the lenticular lens located at the center, x and y are variables for calculation, n is an integer from 1 to VN/2−1 that indicates how far each of the other optical views are away from the optical view located at the center, VW is a distance between both eyes of a viewer of the multi-view image, $\beta$ is an angle formed by an optical view located at the center from the LN-th lenticular lens and the other optical views, and D is the changed rendering pitch.

9. The image display apparatus of claim 1, further comprising an empty space between the curved display panel and the viewing zone divider.

10. The image display apparatus of claim 9, wherein a distance between the curved display panel and the viewing zone divider, which corresponds to the empty space, is determined by the following equation:

$$D = T_s/R_s$$

where D is the distance, $T_s$ is thickness of a spacer, and $R_s$ is an index of refraction of the spacer.

11. The image display apparatus of claim 1, further comprising a sensor configured to detect locations of eyes of a viewer,
wherein the controller is configured to compensate for the rendering pitch based on the locations of the eyes of the viewer detected by the sensor.

12. The image display apparatus of claim 1, wherein the controller is configured to control at least some of the plurality of sub-pixels to output pixel values of at least a first multi-view image and a second multi-view image that are mixed in accordance with the determined rendering pitch.

13. A control method of an image display apparatus, the method comprising:
rendering a multi-view image based on a plurality of images of different views according to a rendering pitch; and
outputting the multi-view image on a curved display panel comprising a plurality of sub-pixels,
wherein at least one of the plurality of sub-pixels comprises a plurality of pixel values corresponding to the plurality of images of different views,
wherein the rendering pitch is determined based on a curvature of the curved display panel, and
wherein the rendering pitch is a predetermined number of sub pixels included in a unit configured to render one of the plurality of images of different views, and is proportional to a radius of the curvature of the curved display panel and an angle formed between an optical view at a center of the plurality of images of different views and an optical view of each of the plurality of images of different views, and inversely proportional to a number of the plurality of images of different views.

14. The method of claim 13, wherein rendering the multi-view image comprises:
  determining a rendering pitch corresponding to a first optical view of the multi-view image based on an angle that is formed by a center of a lenticular lens of the image display apparatus and the first optical view; and
  determining a rendering pitch corresponding to a second optical view of the multi-view image based on an angle that is formed by the center of the lenticular lens and the second optical view.

15. The method of claim 13, wherein rendering the multi-view image comprises:
  determining a rendering pitch corresponding to a first optical view of the multi-view image based on an angle that is formed by a center of an adjacent barrier slit of the image display apparatus and the first optical view; and
  determining a rendering pitch corresponding to a second optical view of the multi-view image based on an angle that is formed by the center of the adjacent barrier slit and the second optical view.

16. The method of claim 13, wherein rendering the multi-view image comprises:
  determining a rendering pitch based on a distance between a viewing zone divider of the image display apparatus and a first optical view of the multi-view image and the curvature of the curved display panel; and
  determining a rendering pitch based on a distance between the viewing zone divider and a second optical view of the multi-view image.

17. The method of claim 13, further comprising detecting locations of eyes of a viewer of the image display apparatus, and
  compensating for the rendering pitch based on the locations of the eyes of the viewer detected by a sensor.

18. The method of claim 13, wherein outputting the multi-view image comprises controlling at least some of the plurality of sub-pixels to output a third pixel value that is determined from a first pixel value of a first multi-view image and a second pixel value of a second multi-view image.

19. The method of claim 13, wherein outputting the multi-view image comprises controlling at least some of the plurality of sub-pixels to output pixel values of at least a first multi-view image and a second multi-view image that are mixed in accordance with the determined rendering pitch.

* * * * *